United States Patent
Zhou et al.

(10) Patent No.: US 10,850,998 B2
(45) Date of Patent: Dec. 1, 2020

(54) METHOD FOR DEGRADING FLUOROQUINOLONE ANTIBIOTICS BY ACTIVATING PEROXYACETIC ACID WITH LANTHANUM RUTHENATE PEROVSKITE

(71) Applicant: Tongji University, Shanghai (CN)

(72) Inventors: Xuefei Zhou, Shanghai (CN); Yalei Zhang, Shanghai (CN); Jiabin Chen, Shanghai (CN); Longlong Zhang, Shanghai (CN); Huaqiang Chu, Shanghai (CN); Huichao Guo, Shanghai (CN)

(73) Assignee: TONGJI UNIVERSITY, Shanghai (CN)

(*) Notice: Subject to any disclaimer, the term of this patent is extended or adjusted under 35 U.S.C. 154(b) by 36 days.

(21) Appl. No.: 16/365,678

(22) Filed: Mar. 27, 2019

(65) Prior Publication Data
US 2020/0207647 A1    Jul. 2, 2020

(30) Foreign Application Priority Data
Dec. 29, 2018    (CN) .......................... 2018 1 1653460

(51) Int. Cl.
| | | |
|---|---|---|
| B01J 23/63 | (2006.01) | |
| B01J 37/08 | (2006.01) | |
| C02F 1/66 | (2006.01) | |
| C02F 1/72 | (2006.01) | |
| C02F 101/34 | (2006.01) | |
| C02F 101/36 | (2006.01) | |
| C02F 101/38 | (2006.01) | |

(52) U.S. Cl.
CPC ............... *C02F 1/725* (2013.01); *B01J 23/63* (2013.01); *B01J 37/082* (2013.01); *C02F 1/66* (2013.01); *C02F 2101/34* (2013.01); *C02F 2101/36* (2013.01); *C02F 2101/38* (2013.01)

(58) Field of Classification Search
CPC ............ B01J 23/63; B01J 37/082; C02F 1/66; C02F 1/725; C02F 2101/34; C02F 2101/36; C02F 2101/38
See application file for complete search history.

(56) References Cited

U.S. PATENT DOCUMENTS

2005/0013836 A1* 1/2005 Raad .................... A61L 2/18
424/400

\* cited by examiner

*Primary Examiner* — Lucas A Stelling
(74) *Attorney, Agent, or Firm* — Bayramoglu Law Offices LLC

(57) ABSTRACT

A method for treating wastewater containing fluoroquinolone antibiotics by activating peroxyacetic acid heterogeneously with lanthanum ruthenate perovskite ($LaRuO_3$) catalyst. The method includes: adding peroxyacetic acid to wastewater containing ciprofloxacin, mixing to obtain a peroxyacetic acid solution, adjusting a pH of the peroxyacetic acid solution; and adding lanthanum ruthenate perovskite to the peroxyacetic acid solution to obtain a mixed solution, and stirring the mixed solution in a constant temperature shaker, and removing the ciprofloxacin at a normal temperature.

7 Claims, 1 Drawing Sheet

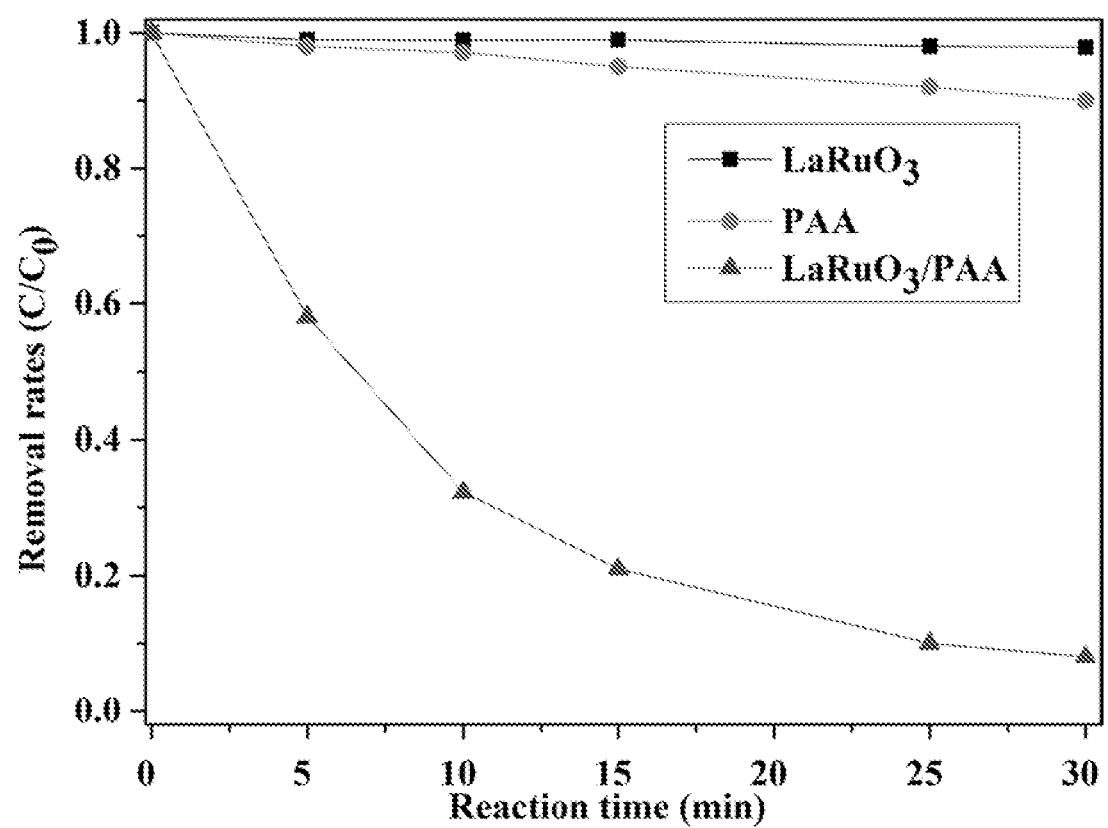

METHOD FOR DEGRADING FLUOROQUINOLONE ANTIBIOTICS BY ACTIVATING PEROXYACETIC ACID WITH LANTHANUM RUTHENATE PEROVSKITE

CROSS REFERENCE TO THE RELATED APPLICATIONS

This application is based upon and claims priority to Chinese Patent Application No. 201811653460.9, filed on 29 Dec. 2018, the entire contents of which are incorporated herein by reference.

TECHNICAL FIELD

The present invention relates to the technical field of water pollution control, and particularly to a method for degrading fluoroquinolone antibiotics in water by activating peroxymonosulfate heterogeneously with lanthanum ruthenate perovskite catalyst.

BACKGROUND

Pharmaceutical and personal care products (PPCPs) are a new category of emerging pollutants, having the characteristics of low concentration, diversity, difficulty in volatilization, and slow biodegradation. The PPCPs include various antibiotics, prescription and non-prescription drugs, skin care products, fragrances, musk, etc., which have been widely detected in the environment. As an important kind of PPCPs, fluoroquinolone antibiotics (FQs) are a kind of synthetic broad-spectrum antibacterial drugs that are widely used in the clinical treatment of various infectious diseases on animals and humans, for example, ciprofloxacin (CIP) is widely used worldwide. FQs have high biotoxicity and are difficult to be biodegraded. When discharged into the environmental water, the FQs will have toxic effects on bacteria, algae, invertebrates and fish, and may cause harm to human body through the food chain, thus causing environmental risks or environmental problems.

The removal technology of FQs in water mainly includes conventional biological treatment technology and advanced treatment technology. Although the biological treatment is simple in operation and low in cost, the removal efficiency is very low for pollutants such as fluoroquinolone which are toxic and difficult to be degraded. However, the advanced treatment technology, especially the advanced oxidation technology based on hydroxyl radicals (HO.), as a novel technology developed in the 1980s for the treatment of persistent organic pollutants, has great potential in the removal of antibiotics and has been widely used in the treatment of wastewater and groundwater.

HO. is a non-selective strong oxidant with the following characteristics: 1. The redox potential (2.8 V) of HO. is relatively high, which is 1.35 times of that of ozone and 2.06 times of that of chlorine, HO. can react with almost all organics and biological macromolecules, and finally achieve the purpose of oxidative degradation through bond breaking reaction, addition reaction, etc.; 2. HO. can attack organic pollutants with a high reaction speed, and the reaction rate is high; 3. HO. can react with almost all organic pollutants and organisms due to its high oxidation activity, so it has no selectivity for the degradation of organics and the killing of microorganisms. HO. can rapidly interact with organisms to eventually oxidize and degrade the organisms into $CO_2$, $H_2O$ and trace inorganic salts, and no harmful by-products are produced.

In the past 30 years, the application of peroxyacetic acid (PAA) in wastewater has attracted more and more attention. Activating PAA to produce HO. has received increasing attention as a novel advanced oxidation technology. Currently, the reported methods for activating PAA mainly include ultraviolet activation and transition metal ion catalyst activation. The ultraviolet activation consumes a large amount of energy, so that the activation cost is relatively high. While the transition metal heterogeneous catalytic technology can be carried out rapidly under normal temperature and normal pressure, without the need of additional energy, and thus has been extensively studied. Although metallic cobalt is considered to be the best activator, its leakage causes secondary pollution problems. Therefore, it is urgent to find a green catalyst to activate PAA.

Ruthenium (Ru)— based catalysts are cheap and have strong corrosion resistance, so their applications in various fields such as catalysis, energy storage and aeronautical materials have gradually become research hotspots. The basic composition of the Ru-based catalyst includes a carrier and an active center. The selection of appropriate carrier materials is helpful to improve the dispersion and stability of the Ru nanoparticles, and improve the utilization efficiency of the Ru catalyst, thus reducing the production cost.

SUMMARY

In view of the above problems existing in the prior art, the present application provides a method for degrading fluoroquinolone antibiotics by activating peroxyacetic acid with lanthanum ruthenate perovskite. The present invention mainly solves the following problems: the peroxyacetic acid has low activation efficiency, and water-soluble metal ions easily cause secondary pollution as a catalyst. The present invention is carried out under normal temperature and normal pressure, which is environment-friendly, low in cost, and easy to operate. The present invention can be applied in a wide range of pH, and has great application potential in the field of environmental pollution control.

The technical solution of the present invention is as follows: A method for degrading fluoroquinolone antibiotics by activating peroxyacetic acid includes the following steps:

(1) adding peroxyacetic acid to wastewater containing ciprofloxacin, mixing to obtain a peroxyacetic acid solution, adjusting a pH of the solution; and (2) adding lanthanum ruthenate perovskite to the mixed solution obtained in step (1), and stirring in a constant temperature shaker, and removing the ciprofloxacin at normal temperature.

A preparation method of the lanthanum ruthenate perovskite is as follows:

(1) according to a molar ratio of La:Ru:CA=1:(1-5):(2-6), respectively weighing $La(NO_3)_3 \cdot 6H_2O$, $RuCl_3$ and $C_6H_8O_7 \cdot H_2O$ for mixing in a beaker, adding water for dissolving to obtain a solution, vigorously stirring the solution while heating the solution to a temperature of 65° C., continuously adding ethylene glycol and maintaining at this temperature until the solution becomes a viscous gelatinous substance due to a slow evaporation of water;

(2) transferring the beaker into a heating jacket for uniform heating, and raising a temperature to 120° C. and maintaining for 1-4 hours, wherein at this time, a 3D polymer structure is formed by reacting citric acid with ethylene glycol;

(3) placing the beaker containing remaining product in an oven for a thorough drying at a temperature not lower than 100° C.; and (4) after the drying, pulverizing the polymer and then calcining at 800° C.-1000° C. for 6-9 hours to decompose the polymer and obtain a desired oxide phase.

A concentration of the ciprofloxacin in the wastewater treated in this application is less than 200 mg/L, the wastewater includes but is not limited to ciprofloxacin.

During the above treatment, a mass ratio of the peroxyacetic acid to the ciprofloxacin is controlled at 1:2-10:1.

During the above treatment, adjusting the pH of the solution means adjusting the pH of the solution to 3-9 with sulfuric acid or sodium hydroxide.

During the above treatment, an additive amount of the lanthanum ruthenate perovskite is 0.5-2 g/L.

During the above treatment, reaction time of the solution when stirred in the constant temperature shaker is 1-30 minutes.

The advantages of the present invention are as follows:

The perovskite-type composite oxides have a general chemical formula of $ABO_3$, wherein the A site is an alkali metal, an alkaline earth metal or a rare earth metal ion that any one of them has a relatively large radius, and the B site is a transition metal ion having a relatively small radius. Since the catalytic activity of the perovskite-type oxide intensively depends on the properties of the B-site cation, the selection of the B-site cation is critical in the design or improvement of perovskite-type catalysts. Therefore, the introduction of the element Ru as the B-site cation, and the perovskite-type composite oxide as the carrier material of the element Ru, the advantages of the two can be perfectly combined, and the performance of the catalysts is greatly improved. The development of lanthanum ruthenate perovskite for activating peroxyacetic acid is a new breakthrough in the research field of controlling PPCPs in water and ensuring water safety.

In the present invention, lanthanum ruthenate perovskite is used as a catalyst, and no secondary pollution will be caused during the catalytic process of lanthanum ruthenate perovskite. The lanthanum ruthenate perovskite has high catalytic efficiency and can be recycled and reused many times. In the present invention, peroxyacetic acid is used as an oxidant. Compared with other oxidants, PAA is less affected by organic substances and does not produce or produce less disinfection by-products. The method provided by the present invention can achieve a highly efficient removal effect in a nearly neutral environment, and in the actual treatment, there is no need to add acid or alkali to adjust the pH, thereby reducing the economic cost.

In the present invention, the lanthanum ruthenate perovskite is firstly developed to activate the persulfate and applied to treat the quinolone antibiotics in wastewater, which improves the activation efficiency of peroxyacetic acid, obtains high-efficient and rapid degradation effect on ciprofloxacin, and facilitates the promotion and application of novel technology of activating peroxyacetic acid in wastewater (liquid) treatment.

BRIEF DESCRIPTION OF THE DRAWINGS

FIG. 1 is a schematic diagram showing a degradation effect of an application example on ciprofloxacin.

In the drawing, PAA is peroxyacetic acid, $LaRuO_3$ is lanthanum ruthenate perovskite; and ordinate $C/C_0$ refers to a ratio of a concentration of ciprofloxacin at predetermined time to an initial concentration of ciprofloxacin.

DETAILED DESCRIPTION OF THE EMBODIMENTS

The present invention will be described in detail below along with the embodiments. However, the protective scope of the present invention is not limited to the embodiments listed below.

Embodiment 1

(1) According to a molar ratio of La:Ru:CA=1:1:2, $La(NO_3)_3 \cdot 6H_2O$, $RuCl_3$ and $C_6H_8O_7 \cdot H_2O$ were respectively weighed and mixed in a beaker, and water was added for dissolving to obtain a solution, the solution was vigorously stirred and heated to 65° C. at the same time, subsequently, ethylene glycol was added and the temperature was maintained until the solution became a viscous gelatinous substance due to a slow evaporation of water;

(2) the beaker was transferred into a heating jacket to for uniform heating, and the temperature was raised to 120° C. and maintained for 1 hour, at this time, a 3D polymer structure was formed by reacting citric acid with the ethylene glycol;

(3) the beaker containing remaining product was placed in an oven for a thorough drying at a temperature higher than 100° C.; and (4) after the drying, the polymer was pulverized and calcined at 800° C. for 8 hours, so that the polymer was decomposed to obtain a desired oxide phase.

Embodiment 2

(1) According to a molar ratio of La:Ru:CA=1:5:6, $La(NO_3)_3 \cdot 6H_2O$, $RuCl_3$ and $C_6H_8O_7 \cdot H_2O$ were respectively weighed and mixed in a beaker, and water was added for dissolving to obtain a solution, the solution was vigorously stirred and heated to 65° C. at the same time, subsequently, ethylene glycol was added and the temperature was maintained until the solution becomes a viscous gelatinous substance due to a slow evaporation of water;

(2) the beaker was transferred into a heating jacket for uniform heating, and the temperature was raised to 120° C. and maintained for 1 hour, at this time, a 3D polymer structure was formed by reacting citric acid with the ethylene glycol;

(3) the beaker containing remaining product was placed in an oven for a thorough drying at a temperature higher than 100° C.; and (4) after the drying, the polymer was pulverized and calcined at 900° C. for 7 hours, so that the polymer was decomposed to obtain a desired oxide phase.

Embodiment 3

(1) According to a molar ratio of La:Ru:CA=1:2:3, $La(NO_3)_3 \cdot 6H_2O$, $RuCl_3$ and $C_6H_8O_7 \cdot H_2O$ were respectively weighed and mixed in a beaker, and water was added for dissolving to obtain a solution, the solution was vigorously stirred and heated to 65° C. at the same time, subsequently, ethylene glycol was added and the temperature was maintained until the solution becomes a viscous gelatinous substance due to a slow evaporation of water;

(2) the beaker was transferred into a heating jacket for uniform heating, and the temperature was raised to 120° C. and maintained for 4 hours, at this time, a 3D polymer structure was formed by reacting citric acid with the ethylene glycol;

(3) the beaker containing remaining product was placed in an oven for a thorough drying at a temperature higher than 100° C.; and (4) after the drying, the polymer was pulverized and then calcined at 1000° C. for 6 hours, so that the polymer was decomposed to obtain a desired oxide phase.

Application Example 1

1.32 mM of peroxyacetic acid was added into wastewater containing ciprofloxacin at a concentration of 10 mg/L to obtain a wastewater solution. The pH of the wastewater was adjusted to 7.0 with 2 mM sulfuric acid and sodium hydroxide solution. Then, 0.5 g/L of the lanthanum ruthenate perovskite prepared in Embodiment 1 was added to the above solution to obtain a mixture, and the mixture was reacted at normal temperature for 30 minutes, and the results are shown in FIG. 1. As can be seen from the FIGURE, in the PAA system activated by the lanthanum ruthenate perovskite, the removal rate of ciprofloxacin in the system can reach about 92% after about 30 minutes. Compared with other activation methods, the activation efficiency of lanthanum ruthenate perovskite on PAA is higher.

Application Example 2

1.32 mM of peroxyacetic acid was added into wastewater containing ciprofloxacin at a concentration of 100 mg/L to obtain a wastewater solution. The pH of the wastewater was adjusted to 3.0 with 2 mM sulfuric acid and sodium hydroxide solution. Then, 1 g/L of the lanthanum ruthenate perovskite prepared in Embodiment 2 was added to the above solution to obtain a mixture, and the mixture was reacted at normal temperature for 30 minutes. The results showed that after 30 minutes of reaction, the removal rate of ciprofloxacin in the system reached about 82%.

Application Example 3

1.32 mM of peroxyacetic acid was added into wastewater containing ciprofloxacin at a concentration of 200 mg/L to obtain a wastewater solution. The pH of the wastewater was adjusted to 9.0 with 2 mM sulfuric acid and sodium hydroxide solution. Then, 2 g/L of the lanthanum ruthenate perovskite prepared in Embodiment 3 was added to the above solution to obtain a mixture, and the mixture was reacted at normal temperature for 30 minutes. The results showed that after 30 minutes of reaction, the removal rate of ciprofloxacin in the system reached about 85%, which indicated that the method also showed a good removal effect on ciprofloxacin at a higher concentration.

What is claimed is:

1. A method for degrading fluoroquinolone antibiotics by activating peroxyacetic acid, comprising the following steps:
   (1) adding peroxyacetic acid to wastewater containing ciprofloxacin, mixing to obtain a peroxyacetic acid solution, adjusting a pH of the peroxyacetic acid solution; and
   (2) adding lanthanum ruthenate perovskite to the peroxyacetic acid solution obtained in step (1) to obtain a mixed solution, and stirring the mixed solution in a constant temperature shaker, and removing the ciprofloxacin.

2. The method according to claim 1, wherein a method for preparing the lanthanum ruthenate perovskite comprises the following steps:
   (1) according to a molar ratio of La:Ru:CA=1:(1-5):(2-6), respectively weighing $La(NO_3)_3 \cdot 6H_2O$, $RuCl_3$ and $C_6H_8O_7 \cdot H_2O$ for mixing in a beaker, and adding water for dissolving to obtain a solution, vigorously stirring the solution while heating the solution to a temperature of 65° C., subsequently, adding ethylene glycol and maintaining at the temperature until the solution becomes a viscous gelatinous substance due to a slow evaporation of water;
   (2) transferring the beaker into a heating jacket for uniform heating, and raising the temperature to 120° C. and maintaining for 1-4 hours, wherein at this time, obtaining a polymer having a 3D structure by reacting citric acid with the ethylene glycol;
   (3) placing the beaker containing the polymer in an oven for a thorough drying at a temperature not lower than 100° C.; and
   (4) after the thorough drying, pulverizing the polymer and then calcining at 800° C.-1000° C. for 6-9 hours to decompose the polymer and obtain the lanthanum ruthenate perovskite.

3. The method according to claim 1, wherein a concentration of the ciprofloxacin in the wastewater is less than 200 mg/L.

4. The method according to claim 1, wherein a mass ratio of the peroxyacetic acid to the ciprofloxacin is controlled at 1:2-10:1.

5. The method according to claim 1, wherein adjusting the pH of the peroxyacetic acid solution includes adjusting the pH of the peroxyacetic acid solution to 3-9 with sulfuric acid or sodium hydroxide.

6. The method according to claim 1, wherein an additive amount of the lanthanum ruthenate perovskite is 0.5-2 g/L.

7. The method according to claim 1, wherein reaction time of the mixed solution when stirred in the constant temperature shaker is 1-30 minutes.

\* \* \* \* \*